(12) United States Patent
Nashiro

(10) Patent No.: US 12,290,015 B2
(45) Date of Patent: May 6, 2025

(54) WORK ASSISTANCE SYSTEM, WORK SYSTEM, WORK ASSISTANCE METHOD, AND PROGRAM

(71) Applicant: Yanmar Power Technology Co., Ltd., Osaka (JP)

(72) Inventor: Kohei Nashiro, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 393 days.

(21) Appl. No.: 17/910,352

(22) PCT Filed: Feb. 19, 2021

(86) PCT No.: PCT/JP2021/006266
§ 371 (c)(1),
(2) Date: Sep. 9, 2022

(87) PCT Pub. No.: WO2021/182069
PCT Pub. Date: Sep. 16, 2021

(65) Prior Publication Data
US 2023/0124315 A1    Apr. 20, 2023

(30) Foreign Application Priority Data
Mar. 11, 2020    (JP) .................................. 2020-041526

(51) Int. Cl.
*A01B 69/04*    (2006.01)
*G06Q 50/02*    (2012.01)

(52) U.S. Cl.
CPC ........... *A01B 69/008* (2013.01); *G06Q 50/02* (2013.01)

(58) Field of Classification Search
CPC ...... A01B 69/008; A01B 69/00; G06Q 50/02; G06Q 10/00; G06Q 10/04; G06Q 10/06; G05D 1/0223
USPC .......................................................... 701/50
See application file for complete search history.

(56) References Cited

U.S. PATENT DOCUMENTS 6,041,582 A * 3/2000 Tiede .................... A01B 79/005
56/10.2 A
2020/0187408 A1* 6/2020 Forbes ................. A01B 79/005

FOREIGN PATENT DOCUMENTS

JP    2018-169826    * 11/2018

* cited by examiner

*Primary Examiner* — Muhammad Shafi
(74) *Attorney, Agent, or Firm* — Chris Mizumoto

(57) ABSTRACT

A work assistance system is a system used together with a work machine, wherein an estimation unit and an output unit are provided. The work machine has an engine as the power source thereof, and travels in a field. On the basis of at least the magnitude of the load of the engine, the estimation unit estimates whether there is an occurrence of a target event that accompanies fluctuations in the load. The output unit outputs output data corresponding to the estimation results from the estimation unit.

9 Claims, 5 Drawing Sheets

WORK ASSISTANCE SYSTEM, WORK SYSTEM, WORK ASSISTANCE METHOD, AND PROGRAM

CROSS-REFERENCE

This application is a national phase of an international application, PCT/JP2021/006266 filed on Feb. 19, 2021, which claims the benefit of Japanese Application No. 2020-041526, filed on Mar. 11, 2020.

TECHNICAL FIELD

The present disclosure generally relates to a work assistance system, a work system, a work assistance method, and a program, and more specifically to a work assistance system used with a work machine powered by an engine as a power source to travel in a field, a work system, a work assistance method, and a program.

BACKGROUND ART

Patent Literature 1 describes a work assistance system (remote server system) for advising a user using a work machine such as a combine serving as an agricultural machine traveling in a field to operate the work machine with low fuel consumption.

In the work assistance system described in Patent Literature 1, for example, a remote server and a terminal server mounted in the work machine are constructed to be communicable with each other. The remote server is constructed to be communicable with terminal servers mounted in many work machines. The terminal servers transmit the position information identified by the GPS, the fuel consumption information, and the like of the work machine to the remote server.

CITATION LIST

Patent Literature

Patent Literature 1: JP 2015-045268 A

DISCLOSURE OF INVENTION

Problems to be Solved by the Invention

During a work with a work machine traveling in a field as described above, an event including, for example, the work machine sinking, that may hinder the work may occur at a certain place in the field. It is required to take some measures against such an event, including an increase in the RPM of the engine of the work machine to travel over, for example. However, the technique described in Patent Literature 1 fails to take into consideration such measures.

The present disclosure has been made in view of the above grounds, and an object of the present disclosure is to provide a work assistance system, a work system, a work assistance method, and a program, with which it is easy to take measures against an event that may hinder a work.

Means for Solving the Problems

A work assistance system according to one aspect of the present disclosure is used with a work machine powered by an engine as a power source to travel in a field, and includes an estimation unit and an output unit. The estimation unit estimates, at least based on a magnitude of a load of the engine, the presence or absence of occurrence of a target event associated with a change in the load. The output unit outputs output data according to an estimation result of the estimation unit.

A work system according to one aspect of the present disclosure includes the work assistance system and the work machine equipped with the engine.

A work assistance method according to one aspect of the present disclosure is a method of assisting a work with a work machine powered by an engine as a power source to travel in a field, and includes an estimation step and an output step. The estimation step includes estimating, at least based on a magnitude of a load of the engine, the presence or absence of occurrence of a target event associated with a change in the load. The output step includes outputting output data according to an estimation result of the estimation step.

A program according to one aspect of the present disclosure is a program for causing one or more processors to execute the work assistance method.

Effect of the Invention

According to the present disclosure, an advantage is achieved that it is easy to take measures against an event that may hinder a work.

DESCRIPTION OF EMBODIMENTS

First Embodiment

Hereinafter, a work assistance system 10 (see FIG. 1), a work system 100 (see FIG. 1), a work assistance method, and a program according to the present embodiment will be described with reference to FIGS. 1 to 5.

(1) Summary

Figure 1:
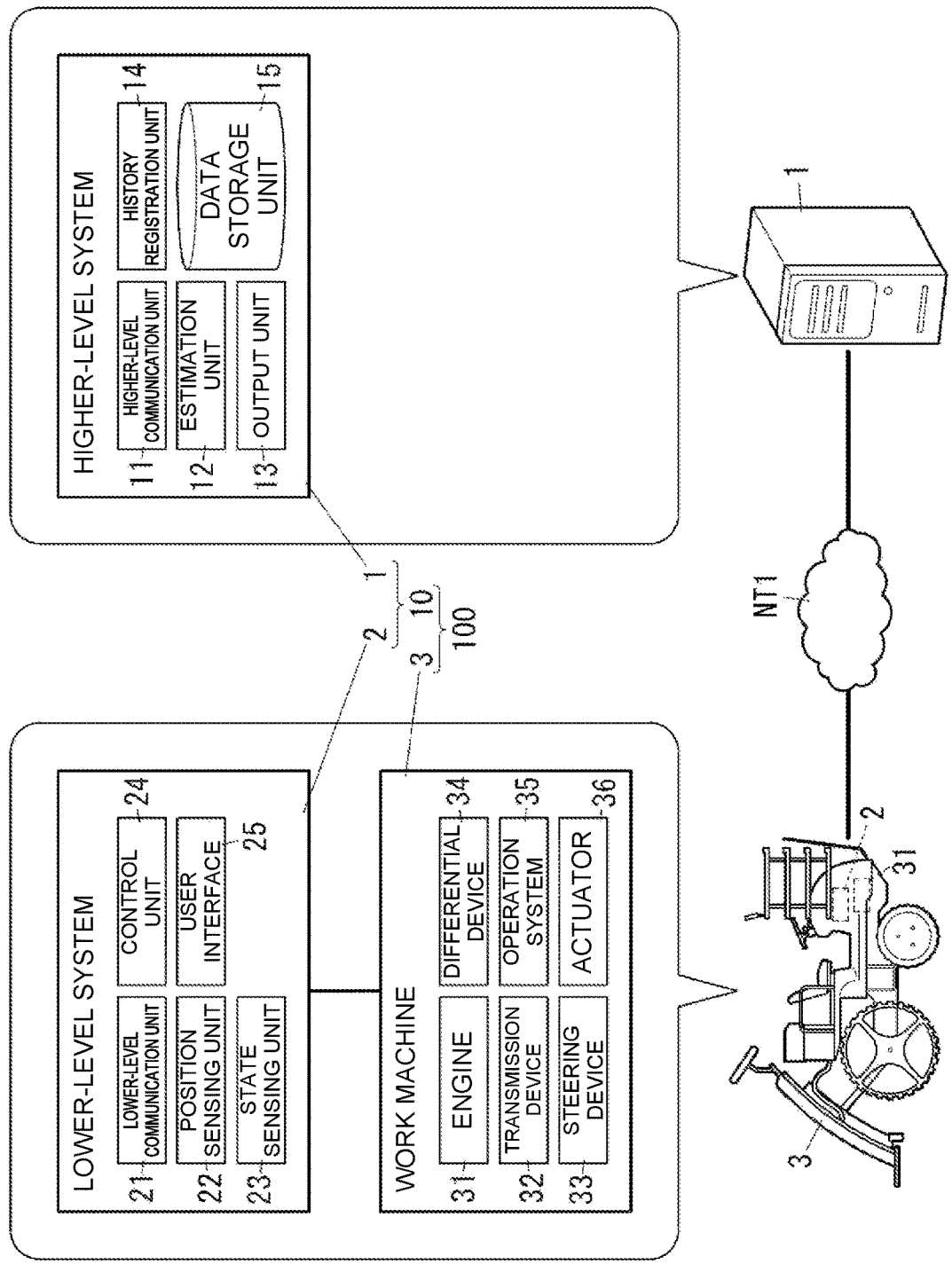
FIG. 1 is a diagram illustrating a schematic configuration of a work assistance system according to a first embodiment.

As illustrated in FIG. 1, the work assistance system 10 according to the present embodiment is a system used with a work machine 3. The work machine 3 is powered by an engine 31 as a power source to travel in a field A1 (see FIG. 2). In other words, the work machine 3 is, for example, an agricultural machine that assists a work related to agriculture, such as a rice transplanter or a tractor. The work assistance system 10 assists a work with the work machine 3 in being used with this type of the work machine 3.

During a work with the work machine 3 traveling in the field A1, an event including, for example, the work machine 3 sinking that may hinder a work may occur at a certain place in the field A1. It is required to take some measures against such an event, including an increase in the RPM of the engine 31 of the work machine 3 to travel over, example. However, in a case where an operator B1 (see FIG. 2) operating the work machine 3 is unfamiliar with the work, appropriate measures may not be taken, which may hinder the work with the work machine 3. For example, in the case of the work machine 3 sinking as described above, if the work machine 3 sinks to the extent that the work machine 3 cannot escape by itself, without taking appropriate measures, it takes time to help the sinking work machine 3 escape, and as a result, the work with the work machine 3 may be delayed.

Therefore, the work assistance system 10 according to the present embodiment employs the following configuration to facilitate to take measures against an event that may hinder the work.

Specifically, as illustrated in FIG. 1, the work assistance system 10 according to the present embodiment is a system used with the work machine 3, and includes an estimation unit 12 and an output unit 13. The work machine 3 is powered by the engine 31 as a power source to travel in the field A1. The estimation unit 12 estimates, at least based on a magnitude of a load of the engine 31, the presence or absence of occurrence of a target event associated with a change in the load. The output unit 13 outputs output data D2 (see FIG. 2) according to an estimation result of the estimation unit 12.

According to this configuration, the estimation unit 12 can estimate the occurrence of a target event associated at least with a change in the load of the engine 31. In addition, the output data D2 according to the estimation result of the estimation unit 12 is output, and thus, the output data D2 makes it possible to obtain at least an opportunity to take some measures against the target event associated with a change in the load of the engine 31. Accordingly, in an example, if it is estimated that a target event occurs in which the work machine 3 sinks, measures including an increase in the RPM of the engine 31 of the work machine 3 to travel over are easily taken based on the estimation result. Therefore, an advantage is achieved that it is easy to take measures against an event that may hinder a work.

Further, as illustrated in FIG. 1, the work system 100 is constructed of the work assistance system 10 according to the present embodiment together with the work machine 3. In other words, the work system 100 according to the present embodiment includes the work assistance system 10 and the work machine 3 equipped with the engine 31. Specifically, the work assistance system 10 is a system for assisting a work with the work machine 3 while the work system 100 is a system for actually doing a work with the work machine 3.

(2) Detail

Hereinafter, the work assistance system 10, the work system 100, the work assistance method, and the program according to the present embodiment will be described in detail.

(2. 1) Definitions

The "work machine" referred to in the present disclosure includes various types of work machines 3 powered by the engine 31 as a power source to travel in the field A1, and includes, in examples, a rice transplanter, a tractor, a sprayer, a transplanter, a sprayer, a harvester, and a combine, which serve as agricultural machines. In the present embodiment, in an example, it is assumed that the work machine 3 is a riding type rice transplanter. Further, in the present embodiment, an outdoor rice field is assumed as an example of the field A1.

The "target event" referred to in the present disclosure is an event to be estimated by the work assistance system 10, and is an event associated with a change in the load of the engine 31 of the work machine 3. Specifically, an event associated with a change in load which makes the engine 31 be in a "high load state" or in a "low load state" is a possible target event. The "high load state" referred to in the present disclosure means a state in which the load is equal to or higher (larger) than a threshold value when viewed from a reference value. The "low load state" referred to in the present disclosure means a state in which the load is equal to or lower (smaller) than a threshold value when viewed from a reference value. The "reference value" referred to here may be, for example, an average value (moving average value) of loads in an immediately preceding predetermined period, or may be a fixed value.

For example, as the travel resistance of the work machine 3 increases, the load of the engine 31 increases, resulting in the high load state. Accordingly, if there is a point in a part of the field A1 where the travel resistance is higher than that of the other parts, the target event may occur when the work machine 3 travels at this point. In the present embodiment, as an example, it is assumed that there is a specific area A11 (see FIG. 2) including mud or the like in a part of the field A1, and the target event is the work machine 3 "sinking" in this specific area A11.

The "sinking" referred to in the present disclosure means an event in which at least part of the wheels of the work machine 3 sinks (buries) in the ground due to mud or the like in the field A1, so that the travel resistance increases, resulting in the high load state. If the sinking is as slight as only a part of a wheel sinks, the work machine 3 can travel over by itself by generally increasing the RPM of the engine 31 of the work machine 3. On the other hand, if the sinking is as significant as even the vehicle body of the work machine 3 sinks, it is difficult for the work machine 3 to escape by self-propelling. In the present embodiment, as an example of the "target event", the slight sinking is assumed among the slight sinking and the significant sinking.

(2. 2) Configuration (2. 2. 1) Overall Configuration

As illustrated in FIG. 1, the work assistance system 10 according to the present embodiment includes a higher-level system 1 and at least one lower-level system 2. Specifically, the work assistance system 10 is constructed of the higher-level system 1 together with the lower-level system 2.

In the present embodiment, each of the higher-level system 1 and the lower-level system 2 has, as a main configuration, a computer system including one or more memories and one or more processors. Specifically, the functions of the higher-level system 1 and the lower-level system 2 are realized by the one or more processors executing programs recorded in the one or more memories of the computer system. The programs may be recorded in advance in the memories, or may be provided through an electric telecommunication line such as the Internet, or may be provided by being recorded in a non-transitory recording medium such as a memory card. Here, the "higher-level" of the higher-level system 1 and the like and the "lower-level" of the lower-level system 2 and the like are simply used as labels to distinguish between the two, and are not intended to specify their positions and ranks.

The higher-level system 1 and the lower-level system 2 are configured to be communicable with each other. In the present disclosure, "communicatable" means that information can be exchanged directly or indirectly via a network NT1 or a relay device or the like by an appropriate communication method of wired communication or wireless communication. In other words, the higher-level system 1 and the lower-level system 2 can exchange information with each other.

In the present embodiment, the higher-level system 1 and the lower-level system 2 are communicable with each other in both directions, that is, both transmission of information from the higher-level system 1 to the lower-level system 2 and transmission of information from the lower-level system 2 to the higher-level system 1 are possible. Both the higher-level system 1 and the lower-level system 2 are connectable to the network NT1 such as the Internet, and exchange information indirectly via the network NT1. More specifically, at least the lower-level system 2 is connected to the network NT1 via, for example, a mobile phone network (carrier network) provided by a telecommunications carrier or a public wireless local area network (LAN). The mobile phone network includes, for example, a third generation (3G) network, a Long Term Evolution (LTE) network, a fourth generation (4G) network, and a fifth generation (5G) network. As a result, the lower-level system 2 is connectable to the network NT1 as long as the lower-level system 2 is in the environment where the lower-level system 2 is connectable to the mobile phone network or the public wireless LAN even outdoors or the like.

In the present embodiment, the work machine 3 used with the work assistance system 10, and the lower-level system 2 have a one-to-one relationship. In other words, one lower-level system 2 is associated with one work machine 3. The lower-level system 2 is, for example, an information terminal having a computer system as a main configuration, and is associated with the work machine 3 by being mounted on the work machine 3. Hereinafter, the work machine 3 associated with a certain lower-level system 2 is also referred to as a work machine 3 under the control of the lower-level system 2. The lower-level system 2 assists a work with the controlled work machine 3 by managing (controlling and/or monitoring) the controlled work machine 3.

Here, at least one lower-level system 2 is communicably connected to one higher-level system 1. One lower-level system 2 is mounted on one work machine 3 as described above, and thus, when there are a plurality of work machines 3, a plurality of lower-level systems 2 are communicatively connected to one higher-level system 1. When there are a plurality of work machines 3, the work system 100 includes one higher-level system 1, a plurality of lower-level systems 2, and a plurality of work machines 3. However, in the present embodiment, for the sake of simplicity of explanation, unless otherwise specified, a case where the work assistance system 10 includes only one lower-level system 2, that is, a case where the work system 100 includes only one work machine 3 will be described by way of example.

(2. 2. 2) Configuration of Each Component

Next, the configuration of each component of the higher-level system 1, the lower-level system 2, and the work machine 3 will be described in more detail with reference to FIG. 1.

The higher-level system 1 includes a higher-level communication unit 11, the estimation unit 12, the output unit 13, a history registration unit 14, and a data storage unit 15. In other words, the work assistance system 10 according to the present embodiment further includes the higher-level communication unit 11, the history registration unit 14, and the data storage unit 15 in addition to the estimation unit 12 and the output unit 13.

The higher-level communication unit 11 indirectly communicates with the lower-level system 2 (a lower-level communication unit 21) via the network NT1. A communication method between the higher-level communication unit 11 and the lower-level system 2 (the lower-level communication unit 21) employs an appropriate communication method of wireless communication or wired communication.

As described above, the estimation unit 12 estimates, at least based on a magnitude of a load of the engine 31, the presence or absence of occurrence of a target event associated with a change in the load. In the present embodiment, as an example, the target event is the work machine 3 "sinking". Accordingly, the target event includes an event associated with a change in the load when the load is in the high load state. According to this configuration, it is possible to estimate a specific event in which the load is in the high load state.

Further, in the present embodiment, the estimation unit 12 uses a result of comparison between current data D1 (see FIG. 2) and history data to estimate the presence or absence of occurrence of the target event. The current data D1 is data related to the current situation of the work machine 3. The history data is data related to the past situations of the work machine 3. The magnitude of the load is reflected in at least one of the current data D1 and the history data. According to this configuration, with the current data D1 and the history data, it is possible to estimate the target event without constantly monitoring the magnitude of the load.

As described above, the output unit 13 outputs the output data D2 according to the estimation result of the estimation unit 12. The output unit 13 outputs the output data D2 to the higher-level communication unit 11 so that the higher-level communication unit 11 can transmit the output data D2 to the lower-level system 2. In the present embodiment, the output data D2 includes instruction information for controlling the RPM of the engine 31. According to this configuration, the output data D2 can be used to control the RPM of the engine 31. Further, in the present embodiment, the output unit 13 outputs the output data D2 at a timing before the target event occurs. According to this configuration, it is easy to take measures against the target event prior to the occurrence of the target event.

The history registration unit 14 registers history data. Specifically, the history registration unit 14 generates history data and records (stores) the generated history data into the data storage unit 15 to register the history data.

The data storage unit 15 stores (records) data such as the history data. Further, the data storage unit 15 further stores information and the like necessary for the calculation in the estimation unit 12 and the like. The data storage unit 15 includes a rewritable non-volatile memory such as an electrically erasable programmable read-only memory (EEPROM).

The lower-level system 2 includes the lower-level communication unit 21, a position sensing unit 22, a state sensing unit 23, a control unit 24, and a user interface 25. In other words, the work assistance system 10 according to the present embodiment further includes the lower-level communication unit 21, the position sensing unit 22, the state sensing unit 23, the control unit 24, and the user interface 25 in addition to the estimation unit 12 and the output unit 13.

The lower-level communication unit 21 indirectly communicates with the higher-level system 1 (the higher-level communication unit 11) via the network NT1.

The position sensing unit 22 senses the position of the lower-level system 2, that is, the position of the work machine 3 mounted with the lower-level system 2. The position sensing unit 22 is realized by using a satellite positioning system such as the Global Positioning System (GPS) in an example.

The state sensing unit 23 senses the state of the work machine 3. The "state of the work machine 3" referred to in the present disclosure includes the RPM of the engine 31, the state of an operation system 35 such as an accelerator opening, and the operating states of a transmission device 32, a steering device 33, a differential device 34, and the like. To sense the RPM of the engine 31, the state sensing unit 23 measures the RPM of a component such as a crank pulley or a flywheel, which rotates in synchronization with the rotation of the engine 31, by means of a sensor such as a rotary encoder. Further, to sense the state of the operation system 35 such as an accelerator opening, the state sensing unit 23 measures the rotation angle (or movement amount) of the operation system 35 such as an accelerator lever, by means of a sensor such as a potentiometer, for example.

The control unit 24 controls the work machine 3. According to this configuration, the work machine 3 can be automatically controlled without being operated by the operator B1. As an example in the present embodiment, the control unit 24 controls the components such as the engine 31 of the work machine 3 by controlling an actuator 36 connected to the operation system 35 of the work machine 3. Specifically, the control unit 24 controls the accelerator opening by driving the actuator 36 connected to the accelerator lever serving as the operation system 35. In the present embodiment, the control unit 24 controls the work machine 3 according to the output data D2. According to this configuration, the output data D2 according to the estimation result of the estimation unit 12 is reflected in the control of the work machine 3.

The user interface 25 includes, for example, a touch panel display, and performs receiving operations from the operator B1 (person) and presenting (displaying) information to the operator B1. The user interface 25 is not limited to the touch panel display, and may include, for example, an input device such as a keyboard, a pointing device, a mechanical switch, or a gesture sensor. Further, the user interface 25 may include an audio input/output unit instead of the touch panel display or in addition to the touch panel display.

The work machine 3 includes the engine 31, the transmission device 32, the steering device 33, the differential device 34, the operation system 35, and the actuator 36. These components included in the work machines 3 are mounted on the body of the work machine 3 together with the lower-level system 2.

The engine 31 is a power source for the work machine 3, and is, for example, a diesel engine. The power generated by the engine 31 is used for at least traveling of the work machine 3. Further, the power generated by the engine 31 is also distributed to a rice transplanter mechanism and the like mounted to the work machine 3, and is also used for driving, for example, a transplanting arm for rice transplanting.

The transmission device 32 changes the traveling direction (forward/backward) and the moving speed (vehicle speed) of the work machine 3 while transmitting the power of the engine 31 to the drive wheels and the like. In particular, it is assumed here that a continuously variable transmission is used as the transmission device 32, and even when the RPM of the engine 31 is constant, the moving speed of the work machine 3 can be changed continuously by the transmission device 32. As an example in the present embodiment, a hydraulic mechanical transmission (HMT) is used as the transmission device 32.

The steering device 33 is a device that controls the steering angle of the front wheels of the work machine 3. As an example in the present embodiment, the steering device 33 is a power steering.

The differential device 34 is a device provided between the left drive wheel and the right drive wheel in the work machine 3 to absorb the rotational difference between the two drive wheels. The differential device 34 has at least a differential lock mode in which both drive wheels are directly connected to each other so that the RPMs of both drive wheels are the same.

The operation system 35 is a system in which the operator B1 performs various types of operations related to traveling of the work machine 3, and includes an accelerator lever, a steering wheel, a differential lock pedal, a shift lever, a shift pedal, and the like. For example, the operator B1 can change the RPM of the engine 31 by operating the accelerator lever.

The actuator 36 is mechanically connected to the operation system 35 and operates the operation system 35 without relying on the operator B1. In other words, the actuator 36 makes it possible to automatically operate the work machine 3.

Further, in addition to the configuration described above, the work assistance system 10 further includes, for example, a power supply circuit of the lower-level system 2.

(2. 3) Operation

Figure 2:
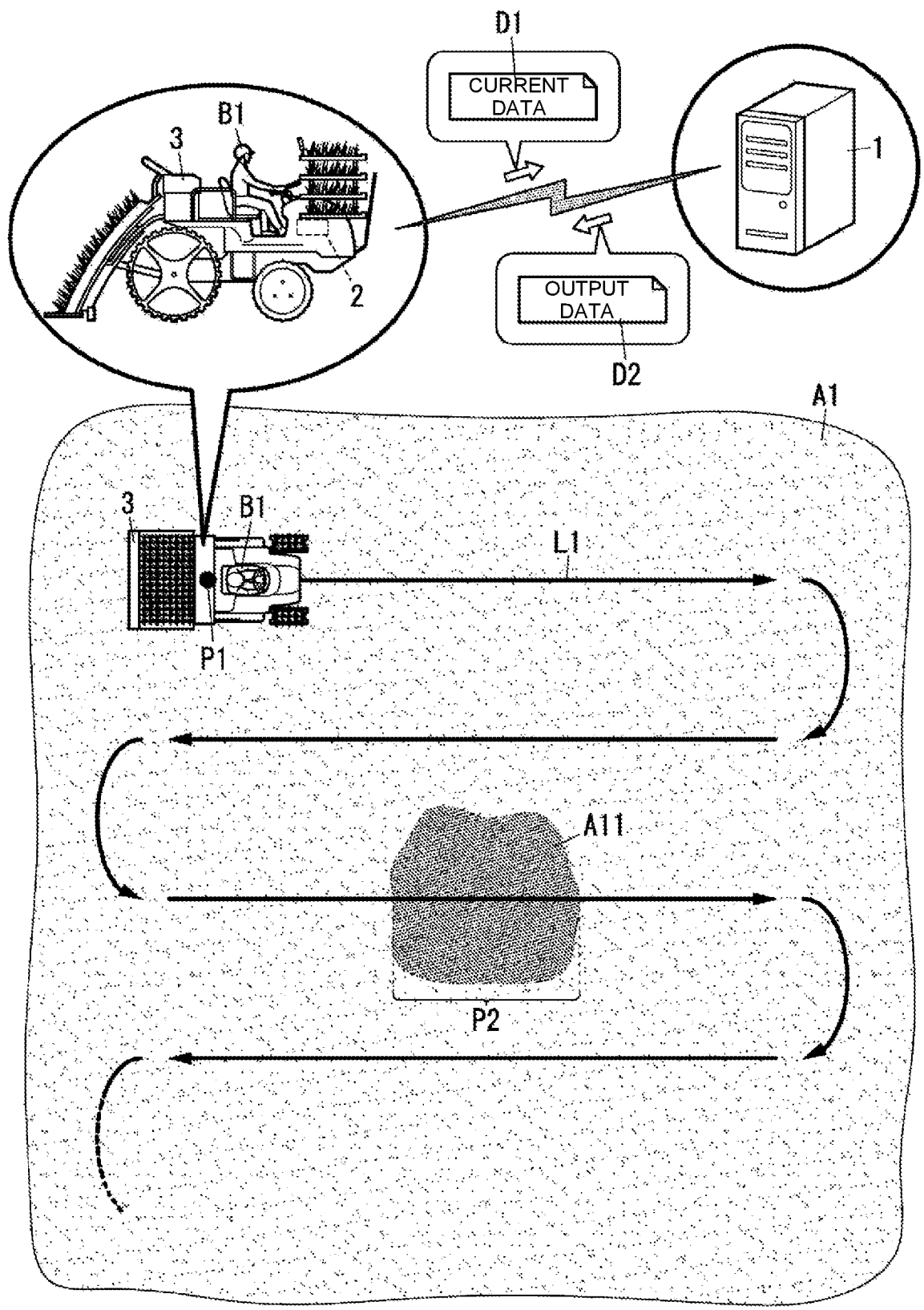
FIG. 2 is an explanatory diagram illustrating an example of using the same work assistance system.

Next, an operation of the work assistance system 10 will be described. Here, as an example, as illustrated in FIG. 2, it is assumed that there is the specific area A11 including mud or the like in a part of the field A1, and the target event, which is the work machine 3 "sinking", occurs in this specific area A11.

In the present embodiment, as described above, the estimation unit 12 uses a result of comparison between the current data D1 and the history data to estimate the presence or absence of occurrence of the target event. Therefore, for the estimation unit 12 to estimate the presence or absence of occurrence of the target event, it is necessary that the history data is registered in advance. Thus, to describe the operation of the work assistance system 10, a process of registering history data and a process of estimating a target event will be described separately below.

Figure 3:
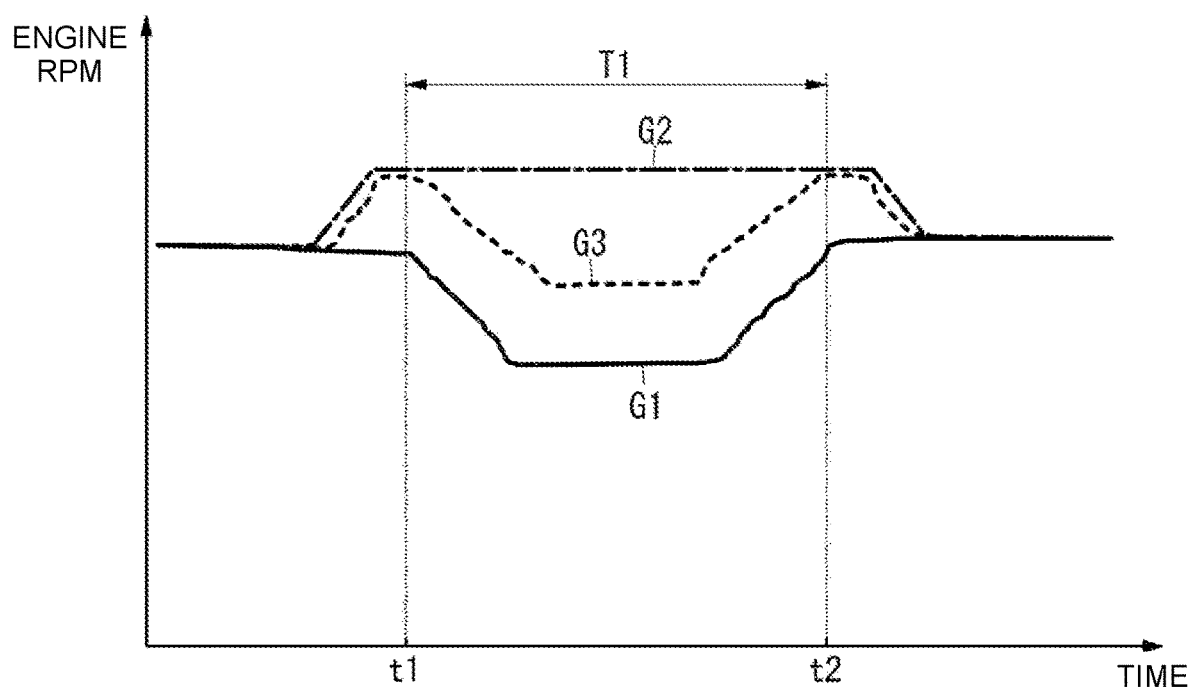
FIG. 3 is a graph of an engine RPM illustrating an example of using the same work assistance system.

FIG. 3 is a graph showing changes in the RPM of the engine 31 when the work machine 3 travels in the field A1. In FIG. 3, when the work machine 3 travels in the field A1, the time point when the work machine 3 reaches the specific area A11 is set as a first time point t1, and the time point when the work machine 3 leaves the specific area A11 is set as a second time point t2. In addition, the period during which the work machine 3 travels in the specific area A11 is a period T1 on the time axis (horizontal axis). A graph G1 in FIG. 3 indicates the RPM of the engine 31 in the process of registering the history data. A graph G2 in FIG. 3 indicates an indicator value of the RPM of the engine 31 in the process of estimating the target event, and a graph G3 in FIG. 3 indicates the RPM of the engine 31 in the process of estimating the target event.

(2. 3. 1) Registration of History Data

Figure 4:
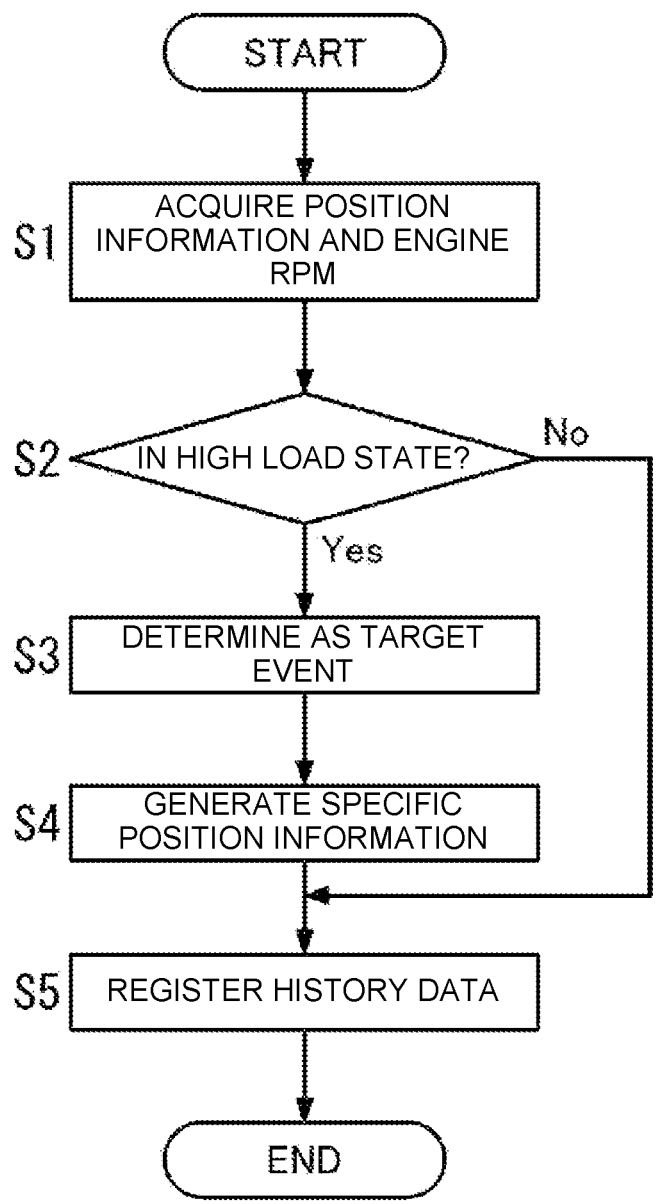
FIG. 4 is a flowchart illustrating an example of an operation of the same work assistance system.

Firstly, the process of registering the history data will be described with reference to FIGS. 2 to 4.

While the work machine 3 travels in the field A1 by being operated by the operator B1, the lower-level system 2 regularly or irregularly transmits the current data D1 to the higher-level system 1. The current data D1 includes at least position information related to the position of the work machine 3 ("P1" in the example of FIG. 2) sensed by the position sensing unit 22. Here, as an example, the current data D1 further includes state information related to the state of the work machine 3 sensed by the state sensing unit 23, in addition to the position information. The state information includes the RPM of the engine 31, the state of an operation system 35 such as an accelerator opening, and the operating states of the transmission device 32, the steering device 33, the differential device 34, or the like. Accordingly, the higher-level system 1 acquires the position information and the RPM of the engine 31 by receiving the current data D1 (S1 in FIG. 4).

Basically, when acquiring the current data D1 from the lower-level system 2, the history registration unit 14 of the higher-level system 1 registers, as history data, the position information and the state information in the current data D1 in association with each other. In other words, the history data is time-series data including a combination of the position (position information) of the work machine 3 and the RPM (state information) of the engine 31.

Here, in the present embodiment, the history registration unit 14 determines, for each piece of the current data D1, whether the load of the engine 31 is in the high load state based on the RPM of the engine 31 (S2). At this time, as an example, the history registration unit 14 determines the high load state if the RPM of the engine 31 included in the state information is lower than the indicator value of the RPM of the engine 31 specified by the accelerator opening, by a predetermined value or more.

In the example of FIG. 3, the RPM of the engine 31 is substantially constant as indicated by the graph G1 except in the specific area A11. On the other hand, in the specific area A11, the RPM of the engine 31 is significantly reduced. Therefore, it is determined that the current data D1 obtained while the work machine 3 travels in the specific area A11 is of the high load state.

When it is determined that the load is in the high load state (S2: Yes), the history registration unit 14 determines that the target event occurs (S3), and generates specific position information so that the position information in the current data D1 at that time is the specific position information (S4). In the example of FIG. 2, the position information of a position P2 is the specific position information. Here, the position P2 is the position of the work machine 3 traveling in the specific area A11, and is represented by not only one point but also a certain width. When the specific position information is generated, the history registration unit 14 registers the history data including the specific position information (S5). On the other hand, when it is determined that the load is not in the high load state (S2: No), the history registration unit 14 skips the processing of S3 and S4 and registers the history data (S5).

The history data registered in this way reflects the magnitude of the load of the engine 31. In other words, the history data includes the specific position information determined based on the magnitude of the load, and thus, the magnitude of the load is reflected in the history data.

In the process of registering the history data, the work assistance system 10 repeats the processing of S1 to S5 every time the current data D1 is acquired. As a result, the history while the work machine 3 travels in the field A1 is recorded as history data in the data storage unit 15. A flowchart of FIG. 4 is merely an example, and the order of processing may be changed as appropriate, and some processing may be added or deleted as appropriate.

(2. 3. 2) Estimation of Target Event

Figure 5:
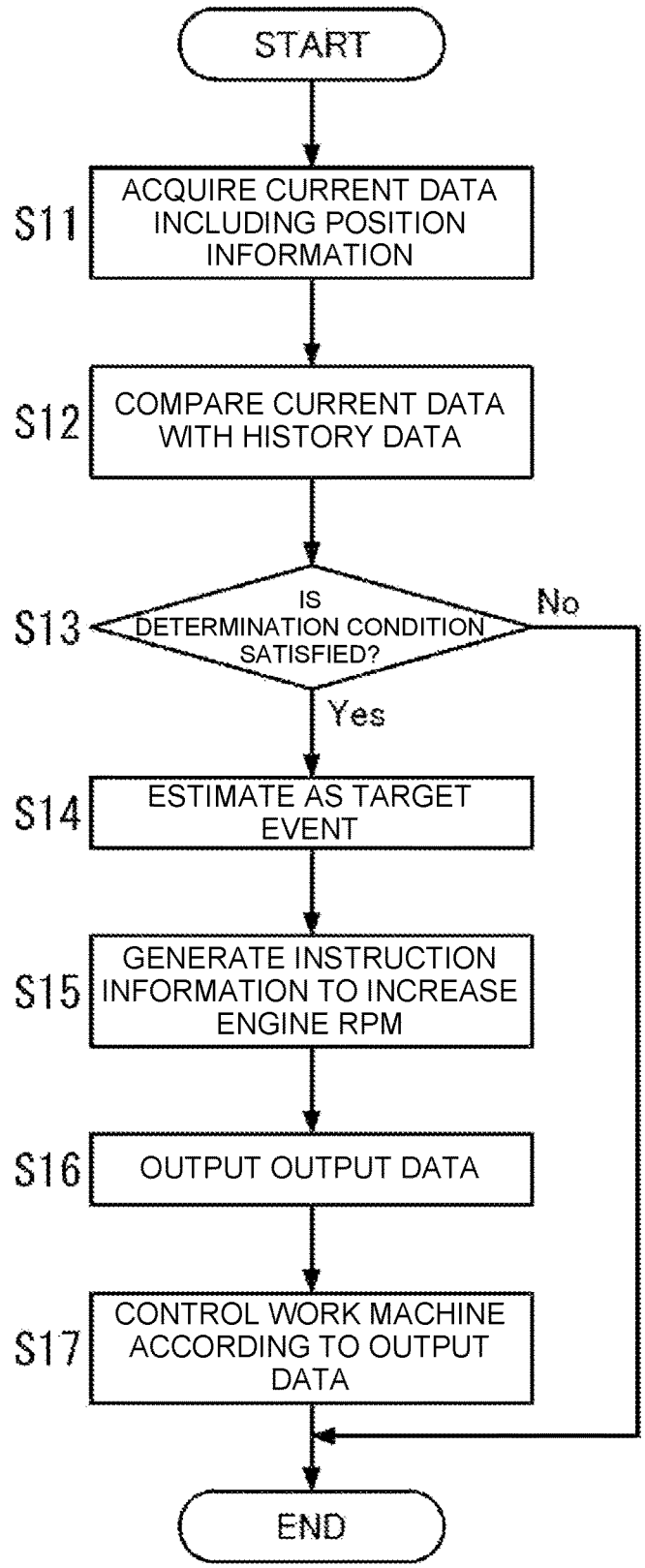
FIG. 5 is a flowchart illustrating an example of an operation of the same work assistance system.

Next, the process of estimating the target event will be described with reference to FIGS. 2, 3, and 5.

While the work machine 3 travels in the field A1 by being operated by the operator B1, the lower-level system 2 regularly or irregularly transmits the current data D1 to the higher-level system 1. As described above, the current data D1 includes at least position information related to the position of the work machine 3 ("P1" in the example of FIG. 2) sensed by the position sensing unit 22. Accordingly, the higher-level system 1 acquires the current data D1 including the position information (S11 in FIG. 5).

Basically, when acquiring the current data D1 from the lower-level system 2, the estimation unit 12 of the higher-level system 1 compares the current data D1 with the history data (S12), and estimates the presence or absence of occurrence of the target event from the result of comparison. Here, the estimation unit 12 determines whether the result of comparison between the current data D1 and the history data satisfies a determination condition (S13), and when the determination condition is satisfied (S13: Yes), the estimation unit 12 estimates that the target event occurs (S14). The determination condition includes, for example, that the position information in the current data D1 and the specific position information in the history information satisfy a predetermined relationship. The "predetermined relationship" includes, as an example, a relationship in which the relative distance between the position indicated by the position information and the position indicated by the specific position information is equal to or less than a threshold value.

In other words, according to the present embodiment, the history data includes at least the specific position information related to the position of the work machine 3 when the target event has occurred. The current data D1 includes the position information related to the position of the work machine 3. The estimation unit 12 estimates that the target event occurs when the position information and the specific position information satisfy the predetermined relationship. According to this configuration, it is possible to estimate the target event from the positional relationship of the work machines 3.

When it is estimated that the target event occurs, the output unit 13 generates instruction information for increasing the RPM of the engine 31 (S15), and outputs (transmits) the output data D2 including this instruction information to the lower-level system 2 (S16). On acquiring the output data D2 from the higher-level system 1, the lower-level system 2 causes the control unit 24 to control the work machine 3 according to the output data D2 (S17). At this time, the control unit 24 controls the accelerator opening by driving the actuator 36 connected to, for example, the accelerator lever serving as the operation system 35, to increase the RPM of the engine 31. When the determination condition is not satisfied (S13: No), the processing of S14 to S17 is skipped.

As a result, while the work machine 3 is located in the vicinity of the specific area A11, it is estimated that the target event occurs, and the engine 31 is controlled based on the output data D2 to increase the RPM. Therefore, as indicated in the graph G2 of FIG. 3, the indicator value of the RPM of the engine 31 increases before the first time point t1 when the work machine 3 reaches the specific area A11, and the indicator value of the RPM of the engine 31 decreases after the second time point t2 when the work machine 3 leaves the specific area A11. Thus, as indicated in the graph G3, even when the RPM of the engine 31 increases following the indicator value before the first time point t1 when the work machine 3 reaches the specific area A11, and then the RPM of the engine 31 decreases during the work machine 3 traveling in the specific area A11, the amount of decrease can be made smaller. In other words, as compared with the RPM of the engine 31 when the RPM of the engine 31 is not controlled to increase, the RPM of the engine 31 when controlled can have a smaller amount of decrease from the RPM of the engine 31 before the output data D2 is output.

In the process of estimating the target event, the work assistance system 10 repeats the processing of S11 to S17 every time the current data D1 is acquired. As a result, the presence or absence of the target event is constantly monitored while the work machine 3 travels in the field A1. A flowchart of FIG. 5 is merely an example, and the order of processing may be changed as appropriate, and some processing may be added or deleted as appropriate.

Incidentally, the control unit 24 controls the work machine 3 according to the output data D2. In the present embodiment, the control target of the control unit 24 includes at least one of the RPM of the engine 31, the moving speed of the work machine 3, the steering device 33 of the work machine 3, and the differential device 34 of the work machine 3. According to this configuration, various controls of the work machine 3 are possible. In the present embodiment, the output data D2 includes the instruction information for controlling the RPM of the engine 31, and thus, the control target of the control unit 24 includes at least the RPM of the engine 31. As a result, the control unit 24 increases the RPM of the engine 31 prior to the target event.

Here, the control target of the control unit 24 may include at least one of the moving speed of the work machine 3, the steering device 33 of the work machine 3, and the differential device 34 of the work machine 3, in addition to or instead of the RPM of the engine 31.

If the control target is the moving speed (vehicle speed) of the work machine 3, the control unit 24 controls the transmission device 32 by driving the actuator 36 connected to, for example, the change pedal serving as the operation system 35. As an example, to increase the RPM of the engine 31 in synchronization with the target event, the control unit 24 may accelerate the work machine 3 to make it easy to travel over the specific area A11, or conversely, may decelerate the work machine 3 to reduce the slip ratio of the work machine 3 in the field A1. Further, to increase the RPM of the engine 31 in synchronization with the target event, the control unit 24 may maintain a constant moving speed of the work machine 3 to realize stable traveling, or may maintain the constant speed or higher. It is preferable to determine as appropriate how to control the moving speed of the work machine 3 depending on the condition of the field A1 and the like.

If the control target is the steering device 33 of the work machine 3, for example, the control unit 24 controls the steering device 33 so that the steering angle approaches straight ahead when the RPM of the engine 31 is increased in synchronization with the target event. If the control target is the differential device 34 of the work machine 3, for example, the control unit 24 controls the differential device 34 so that the work machine 3 enters the differential lock mode when the RPM of the engine 31 is increased in synchronization with the target event.

(2. 3. 3) Supplements for Estimation of Target Event

Supplements for the estimation of the target event will be described below.

Specifically, in the present embodiment, as described above, the estimation unit 12 basically estimates that the target event occurs when the position information in the current data D1 and the specific position information in the history data satisfy the predetermined relationship. However, the estimation unit 12 does not necessarily estimate that the target event occurs when the position information and the specific position information satisfy the predetermined relationship, and there are cases where the estimation unit 12 does not estimate that the target event occurs as an exception. For example, there is a case where for the current data D1 that also differs in the type of work done with the work machine 3 from the history data registered more than one year ago, it is not preferable to estimate that the target event occurs even if the position information and the specific position information satisfy the predetermined relationship. Thus, the estimation unit 12 reduces erroneous estimation of the target event by using not only the positional relationship of the work machine 3 but also supplementary information other than the position of the work machine 3.

As an example, some correlation in a work done with the work machine 3 between the history data and the current data D1 including, for example, the same type of work being done with the work machine 3 between the history data and the current data D1, may be supplementary information for estimating that the target event occurs. Specifically, when the work done with the work machine 3 associated with the current data D1 is the same as the work when the history data was registered, and the position information and the specific position information satisfy the predetermined relationship, it is estimated that the target event occurs. For example, for the history data registered at the time of rice transplanting work done with the work machine 3 including a rice transplanter and the current data D1 obtained at the time of a rice transplanting work for the next year, when the position information and the specific position information satisfy the predetermined relationship, it is estimated that the target event occurs.

As another example, some correlation in a period of time in which a work is done with the work machine 3 between the history data and the current data D1 including, for example, a work being continuously done with the work machine 3, may be supplementary information for estimating that the target event occurs. Specifically, when the work done with the work machine 3 associated with the current data D1 corresponds to the step next to the work when the history data was registered, and the position information and the specific position information satisfy the predetermined relationship, it is estimated that the target event occurs. For example, for the history data registered at the time of the work done with the work machine 3 including a tractor and the current data D1 obtained at the time of the work done with the work machine 3 including a rice transplanter corresponding to the step next to the work done with the tractor, when the position information and the specific position information satisfy the predetermined relationship, it is estimated that the target event occurs.

(3) Modifications

The first embodiment is merely one of various embodiments of the present disclosure. The first embodiment can be modified in various ways depending on the design and the like as long as the object of the present disclosure can be achieved. Each figure described in the present disclosure is a schematic view, and the ratios of the size and thickness of each component in each figure does not necessarily reflect the actual dimensional ratio. Further, the functions similar to those of the work assistance system 10 according to the first embodiment may be embodied in a work assistance method, a computer program, a non-transitory recording medium recorded with the computer program, or the like. The work assistance method according to one aspect is a method of assisting a work with a work machine, and includes an estimation process (corresponding to "S11" to "S14" in FIG. 5) and an output process (corresponding to "S16" in FIG. 5). The work machine 3 is powered by the engine 31 as a power source to travel in the field A1. The estimation step includes estimating, at least based on a magnitude of a load of the engine 31, the presence or absence of occurrence of a target event associated with a change in the load. The output step includes outputting the output data D2 according to an estimation result of the estimation step. A (computer) program according to one aspect is a program for causing one or more processors to execute the above-mentioned work assistance method.

Hereinafter, modifications of the first embodiment are enumerated. The modifications described below are applicable in combination as appropriate.

The work assistance system 10 in the present disclosure includes a computer system. The computer system mainly includes a memory and a processor serving as hardware. When the processor executes the program recorded in the memory of the computer system, the functions as the work assistance system 10 in the present disclosure are realized. The program may be recorded in advance in the memory of the computer system, may be provided through an electric telecommunication line, and may be recorded on a non-transitory recording medium such as a memory card, an optical disk, and a hard disk drive, which are readable by the computer system, to be provided.

Further, it is not an essential configuration for the work assistance system 10 that at least some of the functions of the work assistance system 10 are integrated in one housing, and the components of the work assistance system 10 may be distributed over a plurality of housings. For example, the estimation unit 12 of the work assistance system 10 may be provided in a housing different from that of the output unit 13. Further, at least some of the functions of the work assistance system 10 may be realized by a cloud (cloud computing) or the like.

Conversely, in the first embodiment, the functions of the work assistance system 10 distributed over a plurality of devices may be integrated in one housing. For example, at least some of the functions distributed over the higher-level system 1 and the lower-level system 2 may be integrated in the higher-level system 1 or the lower-level system 2.

The work machine 3 for which the work assistance system 10 according to the present embodiment is used is not limited to a riding type rice transplanter, and may be, for example, a tractor, a sprayer, a transplanter, a sprayer, a harvester, or a combine. Further, the work machine 3 is not limited to a riding type agricultural machine, and may be, for example, an automatic operation type agricultural machine.

Further, the specific area A11 is not limited to one place for one field A1, and may be located at a plurality of places in the field A1.

Further, the target event to be estimated by the work assistance system 10 may be an event associated with a change in the load of the engine 31 of the work machine 3, and is not limited to the work machine 3 "sinking" as described in the first embodiment. For example, an event associated with a change in load which makes the engine 31 be in the low load state, such as a slip of the work machine 3 due to the hardness and softness of the soil in the field A1 or the like, may be the target event.

Further, not only the lower-level system 2 but also the higher-level system 1 may be connected to the network NT1 via a mobile phone network, a public wireless LAN, or the like, similarly to the lower-level system 2. Conversely, the lower-level system 2 may also be directly connected to the network NT1 without going through a mobile phone network, a public wireless LAN, or the like.

Further, when there are a plurality of work machines 3 each mounted with the lower-level system 2, history data for the past situations of the plurality of work machines 3 may be stored in the data storage unit 15. Thus, in this case, a plurality of lower-level systems 2 are communicably connected to the higher-level system 1. As a result, a target event occurring in association with any of the plurality of work machines 3 can also be estimated by the work assistance system 10.

Further, the position sensing unit 22 may use, for example, a receiver that receives a beacon signal transmitted by radio waves from a plurality of transmitters in addition to or instead of a satellite positioning system but not limited to using the satellite positioning system such as the GPS. In this case, the plurality of transmitters are arranged at a plurality of locations around the field A1 where the work machine 3 moves, and the position sensing unit 22 senses the position of the work machine 3 based on the positions of the plurality of transmitters and the received radio wave strength of the beacon signal at the receiver.

Further, the position sensing unit 22 includes, for example, sensors such as a speed sensor, an acceleration sensor, or a gyro sensor, and the behavior of the work machine 3 may be sensed by these sensors. Furthermore, the position sensing unit 22 includes, for example, sensors such as an image sensor (camera), a sonar sensor, a radar, and a light detection and ranging (LiDAR), and the surrounding situation of the work machine 3 may be sensed by these sensors. Then, the position sensing unit 22 may sense the position of the work machine 3 by using the behavior and/or the surrounding situation of the work machine 3.

Further, the output form of the output data D2 to be output from the output unit 13 is not limited to the output to the higher-level communication unit 11, and may be, for example, display, sound, printing (printout), transmission to an information terminal carried by the operator B1 and the like, recording on (writing to) a non-transitory recording medium, or the like. In other words, the output unit 13 may output any form of output as long as the output data D2 can be output, and the output data D2 output from the output unit 13 is not limited to being used for the control unit 24 to control the work machine 3. For example, the output data D2 output from the output unit 13 may be presented to the operator B1 through the user interface 25. For example, the user interface 25 may display a place where it is estimated that the target event such as sinking occurs to the operator B1 according to the output data D2, or notify the operator B1 that it is estimated that the target event occurs by a voice output or the like.

Further, the output unit 13 is not limited to the configuration in which the output data D2 is output at a timing before the target event occurs, and for example, and may output the output data D2 at the timing when the target event occurs or at a timing after the target event occurs.

Further, the estimation unit 12 is not limited to the configuration in which the target event is estimated from the positional relationship of the work machine 3 (the position information in the current data D1 and the specific position information in the history data), and may estimate the target event from, for example, a relationship on an elapsed time from the start of the work done with the work machine 3.

Further, the work assistance system 10 may not estimate the target event, for example, in a mask area where a specific work such as a seedling loading work is done in the field A1. The specific work can be sensed, for example, from the operation of the shift lever or the like.

Further, in the case where the control unit 24 automatically takes measures against the target event, the work assistance system 10 may evaluate the content of control of the control unit 24. For example, when the control unit 24 fails to control traveling over the specific area A11, it is preferable to change the content of control.

Second Embodiment

The work assistance system 10 according to the present embodiment is different from the work assistance system 10 according to the first embodiment in that the estimation unit 12 estimates the presence or absence of occurrence of a target event only from the current data D1 without using history data. Hereinafter, components similar to those of the first embodiment are given like reference numerals, and a description thereof will be omitted as appropriate.

Specifically, in the first embodiment, the estimation unit 12 uses a result of comparison between the current data D1 and the history data to estimate the presence or absence of occurrence of the target event, whereas in the present embodiment, the estimation unit 12 estimates the presence or absence of occurrence of the target event without using the history data. Accordingly, in the present embodiment, the history registration unit 14 (see FIG. 1) and related components may be eliminated as appropriate.

Specifically, in the present embodiment, the estimation unit 12 determines, for each piece of the current data D1, whether the load of the engine 31 is in the high load state based on the RPM of the engine 31, in the same manner as the operation of the history registration unit 14 described in the section of "(2. 3. 1) Registration of History Data". Here, as an example, the estimation unit 12 determines that the load of the engine 31 is in the high load state when the RPM of the engine 31 included in the state information is lower than the indicator value of the RPM of the engine 31 specified by the accelerator opening, by a predetermined value or more, and estimates that the target event occurs. In short, in the present embodiment, the estimation unit 12 monitors the load of the engine 31 in real time by using the current data D1 to estimate the presence or absence of occurrence of the target event. In other words, the estimation unit 12 estimates the target event by using the current data D1 reflecting the magnitude of the load of the engine 31, so that the presence or absence of occurrence of the target event is estimated at least based on the magnitude of the load of the engine 31.

The various configurations described in the second embodiment may be employed in combination with the various configurations (including the modifications) described in the first embodiment as appropriate.

The invention claimed is:

1. A work assistance system used with a work machine powered by an engine as a power source to travel in a field, the work assistance system comprising:
   an estimation unit that estimates, at least based on a magnitude of a load of the engine, presence of an occurrence of a target event associated with a change in the load;
   an output unit that outputs output data according to an estimation result of the estimation unit; and
   a control unit that controls the work machine,
   wherein the output unit initiates transmission of the output data to the control unit to control operation of the engine, based on the transmitted output data, at a time prior to the occurrence of the target event.

2. The work assistance system according to claim 1, wherein the target event includes an event associated with the change in the load when the load is in a high load state.

3. The work assistance system according to claim 1, wherein the estimation unit uses a result of comparison between current data related to a current situation of the work machine and history data related to a past situation of the work machine to estimate the presence of the occurrence of the target event, and
   the magnitude of the load is reflected in at least one of the current data and the history data.

4. The work assistance system according to claim 3, wherein the history data includes at least specific position information related to a position of the work machine when the target event has occurred,
   the current data includes position information related to the position of the work machine, and
   the estimation unit estimates that the target event occurs when the position information and the specific position information satisfy a predetermined relationship.

5. The work assistance system according to claim 1, wherein the output data to control operation of the engine includes instruction information for controlling an RPM of the engine.

6. The work assistance system according to claim 1, wherein a control target of the control unit includes at least one of an RPM of the engine, a moving speed of the work machine, a steering device of the work machine, and a differential device of the work machine.

7. A work system comprising:
   the work assistance system according to claim 1; and the work machine equipped with the engine.

8. A work assistance method of assisting a work with a work machine powered by an engine as a power source to travel in a field, the method comprising:
   an estimation step of estimating, at least based on a magnitude of a load of the engine, presence of occurrence of a target event associated with a change in the load; and
   an output step of outputting output data according to an estimation result of the estimation step; and
   a control step that controls the work machine by controlling operation of the engine, based on the output data, at a time prior to the occurrence of the target event.

9. A non-transitory computer-readable medium comprising instructions for causing one or more processors to execute the work assistance method according to claim 8.

* * * * *